United States Patent [19]

Pease et al.

[11] Patent Number: 5,759,102
[45] Date of Patent: Jun. 2, 1998

[54] PERIPHERAL DEVICE DOWNLOAD METHOD AND APPARATUS

[75] Inventors: Logan L. Pease; Robert Luciano, both of Reno, Nev.

[73] Assignee: International Game Technology, Reno, Nev.

[21] Appl. No.: 600,311

[22] Filed: Feb. 12, 1996

[51] Int. Cl.⁶ .................................................. A63F 9/24
[52] U.S. Cl. ............................................................ 463/42
[58] Field of Search .............................. 463/40, 41, 42, 463/43, 44, 30; 273/371; 324/74, 130; 221/3, 9; 235/380, 381, 382; 370/422, 423, 424; 340/825, 825.06, 825.07, 825.08

[56] References Cited

U.S. PATENT DOCUMENTS

| 3,845,472 | 10/1974 | Buchanan et al. | 340/163 |
| 4,305,148 | 12/1981 | Deglin | 370/58 |
| 4,648,063 | 3/1987 | Strout | 364/900 |
| 5,142,624 | 8/1992 | Patrick, II | 395/200 |
| 5,445,295 | 8/1995 | Brown | 221/3 |
| 5,467,609 | 11/1995 | Feeney | 62/259.2 |
| 5,539,304 | 7/1996 | Payne et al. | 324/74 |
| 5,593,349 | 1/1997 | Miguel et al. | 463/30 |

*Primary Examiner*—George Manuel
*Attorney, Agent, or Firm*—Sheridan Ross P.C.

[57] ABSTRACT

Memories in peripherals, coupled to a gaming terminal, are reprogrammed by a method and apparatus which includes transmitting information from an external information source to a gaming terminal. The information is then transmitted from the gaming terminal to the peripheral device, preferably without the need for control by the external information source.

14 Claims, 2 Drawing Sheets

# PERIPHERAL DEVICE DOWNLOAD METHOD AND APPARATUS

The present invention relates to a method and apparatus for downloading information to a peripheral device coupled to a computer and in particular to a process for using the computer to transfer the information to the peripheral device after receipt from an external device.

BACKGROUND INFORMATION

A number of configurations are found in which various types of peripheral devices are coupled to a computer. One example is a gaming device such as an electronic slot machine, electronic keno machine, electronic card game machine (such as poker, blackjack and the like) and electronic lottery terminals. In these situations, a computer which is centered around a microprocessor is coupled to various peripheral devices such as a bill acceptor (for validating currency), a coin acceptor (for validating coins), a card reader (e.g., for reading a credit card, a player-tracker card, a smart card and the like), input/output devices such as a touch screen, keys, indicator lamps, audio output devices such as bells, speakers and the like. In some cases, the operation of a peripheral device is determined by a program stored on a memory device which is mounted on or associated with the peripheral device. The program may control the peripheral device through a peripheral device processor such as a microprocessor, or through logic or other circuitry such as an application-specific integrated circuit (ASIC), programmable logic device and the like. Commonly, some or all of the programming is stored in a non-volatile memory such as a type of read-only memory (ROM). Although many types of read-only memories can be modified to store other or additional programs (such as a programmable read-only memory or PROM), in many previous peripheral devices this was often a labor-intensive and time-consumptive procedure, sometimes involving removing the ROM or other memory device from the peripheral device and reprogramming it in a separate device and/or replacing it with a differently-programmed memory device.

This situation is particularly burdensome in the context of gaming devices in which it is sometimes necessary or desirable to change the programming in a large number of peripheral devices in a relatively short amount of time. One example of such a situation is when it is desired to reprogram a bill-acceptor, e.g. to thwart a previously-unknown counterfeiting scheme. Previous systems which required labor-intensive and time-intensive reprogramming methods increased the risk of incurring losses during the time it took to perform this reprogramming for all the various peripheral devices coupled to various gaming machines (e.g., in a plurality of different casinos).

The situation is particularly troublesome in the context of gaming devices since, in this context, it is not uncommon to have a need for peripheral device reprogramming arise in a fashion which is not under the control of the casino or other operator, such as may arise in response to changes in regulations and/or newly discovered counterfeiting or other cheating schemes (as opposed to updating programs to, e.g., add new features, which is typically an action which is under the control of the casino or other operator).

Furthermore, previous reprogramming took place in a relatively conspicuous manner requiring personnel to access the interior of each individual peripheral and/or terminal, often for an extended period of time, thus potentially alerting the counterfeiters that they had been detected and decreasing the likelihood of using the new software to identify (possibly leading to apprehension of) the counterfeiters. In addition, the time during which a machine was being fitted with the new programs was time that the machine was out of service and not generating revenues.

In some situations, it may be advantageous to update the programming of two or more different peripheral devices coupled to a single gaming device or other computing device. Previous methods would, in this situation, typically have required separately accessing each of the peripheral devices in order to modify or update the memories associated with those peripheral devices.

Additionally, it is often desirable to reprogram peripheral devices of gaming terminals or other computing devices, e.g. to accommodate new games, regulatory changes, correct bugs or other programming errors, install new features and the like. Preferably, this should be accomplished with a minimum of down time of gaming devices (which often are intended normally to be accessible 24 hours a day) and a minimum of inconvenience to players.

Accordingly, it would be advantageous to provide a method and apparatus for downloading programming information to the memories of peripheral devices in a manner which is less labor-intensive and less costly than previously possible, preferably without requiring individual direct access to each peripheral device which is being reprogrammed.

SUMMARY OF THE INVENTION

The present invention provides for loading information, received from an external device (such as a central computer) by the computing device to one or more peripheral devices. In this way it is no longer necessary to have direct access to the peripheral devices or their component or related memories, thus making the process of updating the programming for peripheral devices less time-intensive and less labor-intensive.

In one embodiment, the updated or modified peripheral device program is received in the gaming terminal (or other computing device) from an external device (such as a hand-held or portable device or a central computer coupled via a communications link) and is downloaded from the gaming terminal to one or more coupled peripheral devices.

Preferably, the programming information is downloaded to peripheral devices in such a way as to reduce or minimize the amount of down time or inconvenience to players. In one embodiment, when the new peripheral program is downloaded from a central computer to each gaming terminal, the method avoids disabling all gaming terminals at the same time, such as by waiting until the gaming terminal is idle for a predetermined period before downloading the new program to peripheral devices or by cycling through various gaming terminals or groups of gaming terminals so that a relatively small number of the gaming terminals are disabled (for reprogramming) at any one time.

When reprogramming of two or more peripherals attached to a given gaming terminal is desired, in one embodiment the new programming information for each peripheral to be reprogrammed is downloaded to the gaming terminal and the gaming terminal begins downloading the information to the attached peripherals preferably only after all information has been downloaded to the terminal. In this way, only a single session of downloading to the gaming terminal is needed in order to provide eventual updating of two or more coupled peripherals.

In situations in which security is a concern, such as systems in which money handling occurs (e.g., gaming terminals, lottery terminals, automatic teller machines (ATMs) and the like), the information is preferably encrypted when it is transferred to the computing device and is decrypted either in the computing device, before transmitting to the peripheral devices, or is transmitting to the peripheral devices in encrypted form and is later decrypted by the peripheral device.

DETAILED DESCRIPTION OF THE PREFERRED EMBODIMENTS

Figure 1:
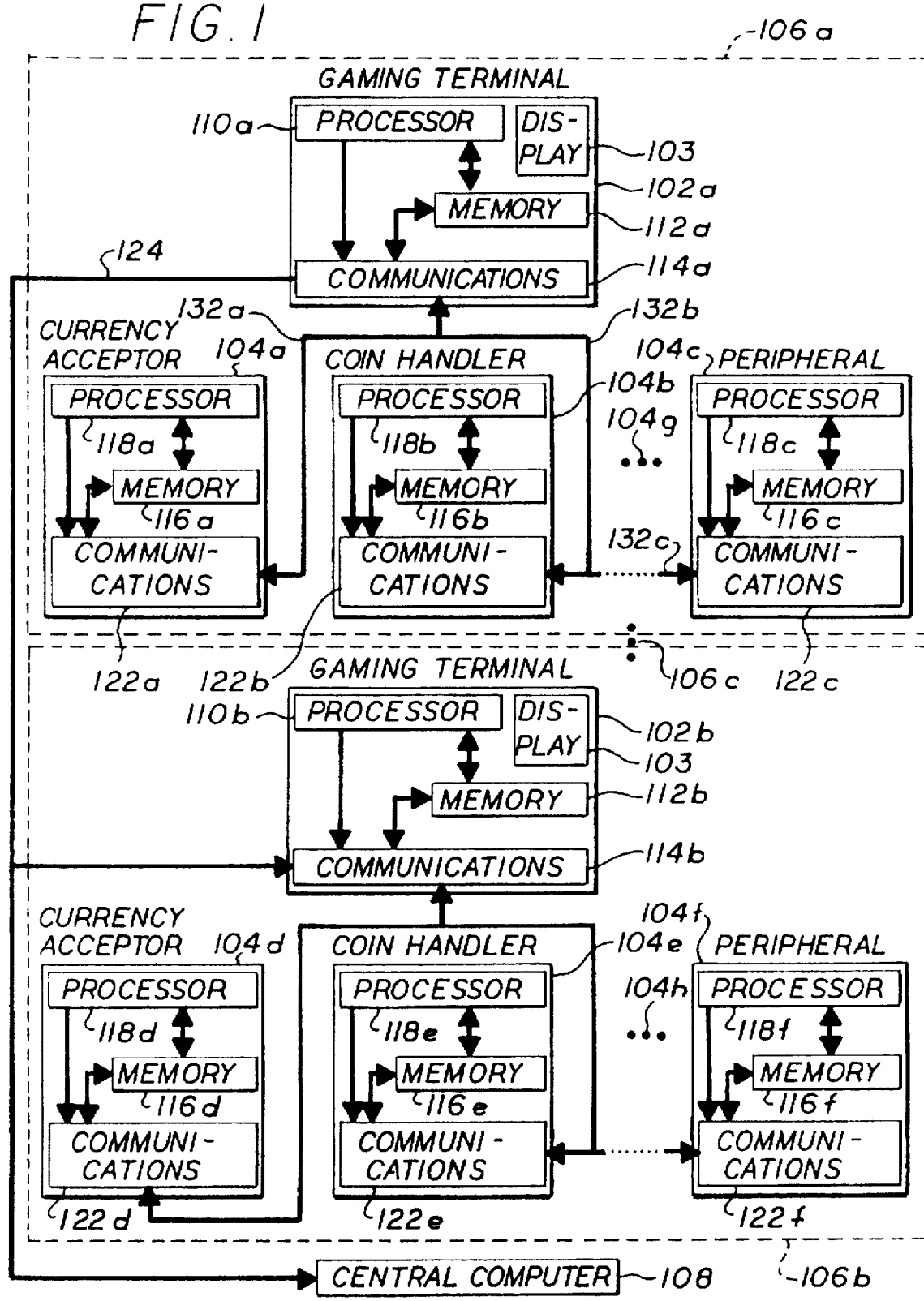
FIG. 1 is a block diagram of a plurality of gaming terminals, each coupled to a plurality of peripheral devices, and a central computer coupled to the gaming terminals which can be used for downloading peripheral programs according to an embodiment of the present invention.

As depicted in FIG. 1, a computing device such as one or more gaming terminals 102a, 102b may be coupled to various peripheral devices 104a, b, c, d, e, f. Many types of peripheral devices can be provided, including the currency acceptor and coin acceptor as depicted, and more than three peripheral devices 104g, 104h may be provided, or fewer may be provided. The gaming terminal or other computing device may be housed in the same housing 106a, 106b as the peripheral devices 104, and more than two gaming devices may be used in connection with the download procedure 106c. In one embodiment, download of information to the gaming terminals 102a, 102b is provided from a central computer 108. However, it is possible to use the present invention in connection with stand-alone gaming terminals and peripherals which are not connected to a central computer 108.

In the depicted embodiment, each gaming terminal includes a processor 110a, 110b, a memory 112a, 112b, and a communications module 114a, 114b. In the depicted embodiment, the processor 110 is coupled to both the memory 112 and the communications module 114 and the memory and communications modules 114, 112 are coupled together to permit communication therebetween. In one embodiment, the processor 110a is an Intel MultiMedia/ Super Computer processor model 80960, although the invention can be used in connection with computing devices having other types of processors and in connection with gaming terminals which are controlled by devices other than microprocessors such as ASICS.

Each peripheral 104a–104f includes a memory device 116a–116f. In one embodiment, the peripheral memory 116a–116f, is a memory which is programmable (i.e., which can be written to), preferably is programmable in situ (i.e., without the need to physically remove the memory device or medium from the peripheral 104), is preferably a non-volatile memory, and preferably can be reprogrammed (including any erasing which may be necessary), entirely electronically (i.e., without the need for exposure to ultra-violet light). In one embodiment, the peripheral memory devices include electronically erasable programmable read-only memory (EEPROM), and/or flash memory.

Information in the memory 116a–116f includes information which determines how the peripheral will operate. In one embodiment, the memory 116a–116f includes a program for controlling a programmable computer such as peripheral processors 118a–118f. Memories 116a–116f may also store data which can affect operation of the peripheral, such as data regarding characteristics of counterfeit bills for detection by a currency acceptor peripheral.

Various configurations are possible for storing new information into the memory 116a–116f. In one configuration, information is provided to the processor 118a and the processor stores such information in the memory 116a. In other configurations, information may be stored directly into the memory 116a from the communications modules 122a–122f, e.g., using a direct memory access (DMA) type procedure, typically under control of the processor 118A.

In the depicted embodiment, each gaming terminal 110A, 110B, is coupled to a central computer 108. The coupling may be by communication link 124, such as a common local area network connection (e.g., Ethernet, Token Ring, LocalTalk, etc.), a wide area network and the like, using any of a variety of physical media such as cables, optical fibers, radio infrared or other wireless links and the like. The type of communication module 114a, 122, which will be used depends on the type of communication link which is being used and may include, e.g., commercially-available network boards and supporting software, modems, universal asynchronous receiver/transmitter (UART) devices and the like.

It is also possible to download information from an information source other than a central computer 108. For example, in one embodiment a portable information source such as a portable computer is coupled to a gaming terminal, e.g., via an optical fiber or IR link, and information is downloaded from the portable information source to a single gaming terminal at a time. This procedure is useful in many contexts, including those in which there is no coupling of gaming terminals to a central computer. However, providing downloading from a central computer to individual gaming terminals has a number of advantages. First, the download can be easily performed on a number of gaming terminals at the same time, so that the amount of time required to perform the download for all the various gaming terminals is reduced. Further, it is not necessary to have personnel physically walk from terminal to terminal, and perform a download at each terminal, so that labor costs are also reduced. Additionally, download from a central computer over an existing information network is unobtrusive, so that users of the gaming terminals are not disturbed by personnel wandering through the casino, and potential counterfeiters or other malfeasors are not easily alerted to the fact that new software is being downloaded, which may serve to make apprehension of such malfeasors more feasible.

Figure 2:
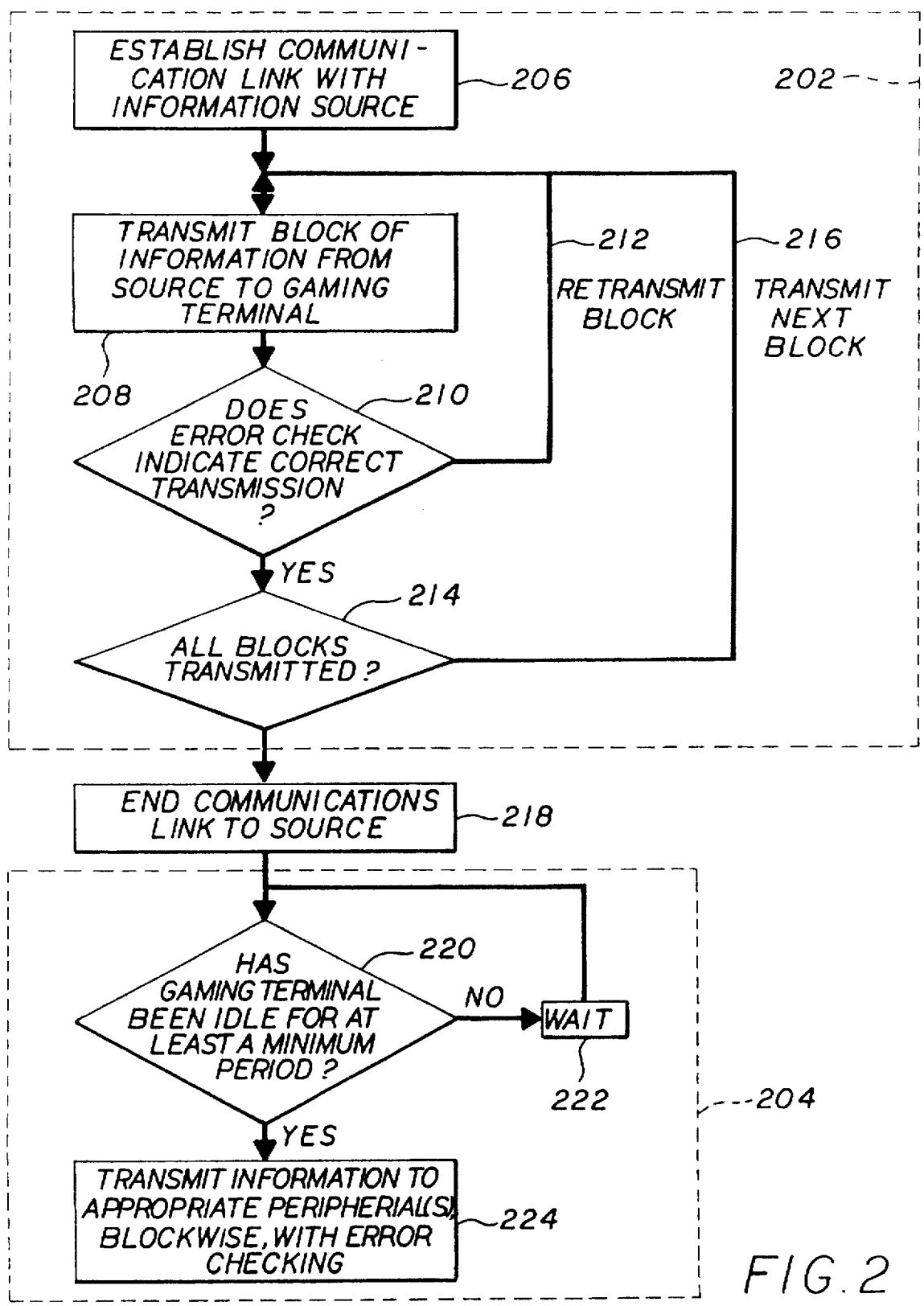
FIG. 2 is a flow chart of a procedure for downloading peripheral information according to an embodiment of the present invention.

FIG. 2 depicts one method for downloading information. The process of FIG. 2 can be generally considered in two portions or sections. In the first portion 202, information is transferred from a data source, e.g. 108, to a gaming terminal 110. In the second portion 204, information is transferred from a gaming terminal 110, to a peripheral 104. In the embodiment of FIG. 2, the process begins with establishing a communication link with the information source 206. In the embodiment of FIG. 1 the information source is the central computer 108. However, as noted above, other types of information sources can be used such as a portable computer, a main frame computer, a device specifically constructed to download information stored in a memory on the device, but which is not, itself, necessarily a computer, and the like. In the embodiment of FIG. 1, a communication link is established, using normal communication procedures associated with the communication link 124 (which can be, e.g., a local area network, a wide area network, a wireless link, and the like), in a manner well known to those of skill in the art.

Following the establishment of the communication link 206, information is transferred from the information source to one or more gaming terminals. Preferably, the information is encrypted before being transmitted to the gaming terminal, particularly if the information is transmitted over a local area or wide area network to avoid the possibility of unscrupulous individuals gaining access to the information for cheating purposes. Many types of data transfer can be used including serial and parallel transfer. In one embodiment, the information which is downloaded may include more than the information to be used for reprogramming the memory of one of the coupled peripherals. For example, the downloaded information may contain new programming information for two or more different peripherals coupled to a gaming terminal and/or may include information for programming the gaming terminal itself, in addition to one or more of the peripherals.

In the embodiment of FIG. 2, the data is transmitted in a block fashion, i.e., by transmitting a predetermined number of bits of the information (such as 1024 bits) from the source to the gaming terminal 208, and then checking for errors in the block 210. As will be well-known to those of skill in the art, other block lengths can also be used. If there are errors detected in the block of information (using, e.g. a cyclic redundancy check error detection routine, or other error detection routines well-known to those of skill in the art), the procedure loops back 212 to retransmit the block. In one embodiment, only a limited number (e.g. 3) of the re-trys are permitted before a total error is declared and the device is put out of service. At the end of each block transmission, it is determined whether all blocks have been transmitted 214. If not, the procedure loops back 216 to transmit the next block. Preferably, following the CRC or other error detection for each block, an overall CRC or other error check is performed after all blocks have been downloaded to the gaming terminal. Thus, at the end of the first portion of the procedure 202, the entire desired information will have been transmitted, block-wise, with error detection, from the information source 108 to at least one gaming terminal 102.

In the embodiment of FIG. 1, it is possible to download the information to two or more gaming terminals 102a, 102b, substantially simultaneously. Thus in one embodiment, the information may be downloaded from a central computer 108 over the communication link 124 to all gaming terminals which are coupled to the central computer 108, substantially simultaneously. However, in some configurations, it will be necessary to suspend use of the gaming terminal during the downloading process. In this case, it may not be desirable to suspend operation of all gaming terminals at the same time. Therefore, in one embodiment information is downloaded from the central computer 108 to a first subset of the connected gaming terminals (during which time, use of that subset of gaming terminals is suspended), and following downloading to that subset of gaming terminals the first set of gaming terminals will be available for normal use, and downloading to the second subset of gaming terminals will be initiated, suspending use of the second subset of gaming terminals during downloading thereof. The process is repeated for various subsets of the gaming terminals until the information has been downloaded to all desired gaming terminals.

In some situations, it may be desired to download information only to some of the connected gaming terminals. For example, if the information to be downloaded is intended to thwart passing of $10 counterfeit bills, there would be no need to download the new information to gaming terminals which are connected to currency acceptor peripherals that accept only $5 bills.

Preferably, the central computer (or other external device) is not needed for (and does not control) downloading from the gaming terminal to the peripheral device. Thus, following the first portion of the procedure 202, at the end of which the desired information has been downloaded to the gaming terminal 102, the communications link 124 with the external device 102 may optionally be ended 218. In the configuration of FIG. 1, it may not be desirable to end the communication link since communication relating to other than the downloading of peripheral programming may be carried on over the communication link 124. For example, in some situations, link 124 is used for other purposes in addition to downloading peripheral programming, such as communicating information regarding the level and type of activity at gaming terminals, the identity of players at gaming terminals, notification of a jackpot or a win at a gaming terminal, and the like. This configuration is particularly advantageous since it permits the present invention to be implemented using a communication link which is already in place, for another purpose, i.e. without the need to install a network or other communication link.

In other cases, however, particularly when the communication link is established solely or primarily for the purpose of downloading peripheral and/or gaming terminal programming, it may be desirable to end the communication link following such downloading 218. For example, when downloading is achieved by carrying a portable information source, such as a portable computer, to each gaming terminal, and connecting, e.g., via an optical link, cable or the like, it will typically be desired to uncouple the cable or optical link from a first gaming terminal in order to permit the information source to be transported to the next gaming terminal for downloading thereto.

As noted above, in some configurations it may be necessary to suspend operation of the gaming terminal during downloading from the information source to the gaming terminals, and/or from the gaming terminal to the peripheral. In one embodiment, the gaming terminal will provide and indication of the suspended status, so that a user will have the option to move to a different gaming terminal or to await reactivation. In one embodiment, the display 103 will provide an estimate of the amount of time before reactivation of the terminal. This estimate can be based, if desired, on an empirically-derived relationship between the average download time and the number of blocks of information to be downloaded, (or other indication of the size of the information to be downloaded).

After downloading to a particular gaming terminal 102, that gaming terminal may then download appropriate information to one or more of the coupled peripherals 104a–104c. In some embodiments it may be desired to configure the gaming terminal so that it will immediately download the information to the appropriate peripherals as soon as it has received that information from the information source. However, in situations in which operation or use of the gaming terminal must be suspended while the information is being downloaded to peripherals, it may be desirable to configure the gaming terminal to wait until there is an apparent idle period of the gaming terminal before commencing downloading to a peripheral. Thus, in the procedure of FIG. 2 the gaming terminal will determine whether it has been idle for at least a predetermined minimum period (such as about one minute, 220). For example, when the gaming terminal is an electronic slot machine, the gaming terminal can use a timer circuit to determine if there has been any wager placed or any handle-pull (or electronic equivalent thereof) for the predetermined period. If the gaming terminal has not been idle for at least the predetermined period, the gaming terminal will optionally wait another predetermined period 221 (such as about one minute) before testing to determine if the gaming terminal is idle. Once the gaming terminal is idle, the gaming terminal can commence procedures to transmit information to appropriate peripherals 224, preferably in a blockwise fashion, with error checking. A number of types of communication links 132a, 132b, 132c, between the gaming terminal (or other computing device) and a peripheral 104a, 104b, 104c, can be used, as will be apparent to those of skill in the programming art. In one embodiment, the processor 110a sends information to a peripheral 104a by placing the information on a data bus, and placing an address of the peripheral device on an address bus. Each peripheral device 104 includes a communications module 122, which is configured to decode and recognize its address and, in response to such recognition, provide the data found on the data bus (appropriately buffered) to its processor 118a, and/or memory 116a. Similarly, the peripherals 104a–104c may communicate with a gaming terminal by placing data on the data bus and sending appropriate interrupt control signals to the gaming terminal processor 110. Other types of communication between a gaming terminal or other computing device and coupled peripherals can also be used, including transmission of data via direct memory access, as will be apparent to those of skill in the art.

Thus, according to one embodiment as depicted in FIG. 2, information to be downloaded is fully or partially downloaded to the gaming terminal 202 before any of the information is downloaded from the gaming terminal to a peripheral 204. It is possible to pass the information through the gaming terminal to the peripheral before all of the information has been downloaded from the central computer to the gaming terminal, such as by passing the information through to the peripheral in a block-wise fashion. Preferably, data integrity, following transmission to the peripheral, is assured by performing a cyclic redundancy check or other error check of the data after receipt in the peripheral.

In light of the above description a number of advantages of the present invention can be seen. The present invention permits the reprogramming of memories in peripheral devices without the need for the information source to directly access those peripheral devices. The present invention makes it possible to provide for new or additional programming for peripheral devices in a manner which is less labor intensive, less time-consumptive, and less obtrusive than pervious methods. The present invention makes it possible to download the programming to a plurality of gaming of terminals (or other computing devices) substantially simultaneously and permits a given gaming terminal (or other computing device) to download appropriate information to two or more connected peripheral devices.

A number of variations and modifications of the invention can also be used. In addition to downloading computer program information, the invention can be used to download data for use by peripherals, such as data which defines the manner in which the peripherals accept currency (or, detect counterfeiting). In addition to a central computer and a portable computer or hand-held device, the information may be downloaded to the gaming terminal from other devices, such as a cluster controller. In addition to gaming terminals, the present invention can be used in connection with downloading to peripherals coupled to other types of computing devices. It is believed the invention will be particularly useful in connection with computing devices which are coupled in a network, such as automatic teller machines, and/or devices which handle coins or currency, such as vending machines.

Although the invention has been described by a way of a preferred embodiment and certain variations and modifications, other variations and modifications can also be used, the invention being defined by the following claims.

What is claimed is:

1. In an electronic gaming system, a method for providing first information for storage in a first memory of a peripheral device coupled to a computer gaming terminal, said computer gaming terminal having a second memory for storing programming for said computer gaming terminal, the method comprising:

providing said first memory as a programmable memory coupled to said peripheral device, wherein said first memory is different from said second memory;

transmitting said first information from an external source to said computer gaming terminal;

transmitting said first information from said computer gaming terminal for receipt by said peripheral device;

storing said first information in said first memory;

using said first information during operation of said peripheral device.

2. A method as claimed in claim 1, wherein said peripheral device is a currency acceptor.

3. A method as claimed in claim 1, wherein said peripheral device is a card reader.

4. A method as claimed in claim 1, wherein said peripheral device is a coin acceptor.

5. A method as claimed in claim 1, wherein said first memory is selected from among EEPROM and flash memory.

6. A method as claimed in claim 1, wherein said external source is a portable source.

7. A method as claimed in claim 6, wherein said portable source is a portable computer.

8. A method as claimed in claim 1, wherein said communication source is an optical link.

9. A method as claimed in claim 1, wherein said external source is a central computer coupled to a plurality of computer terminals.

10. A method as claimed in claim 1, wherein said communication link is a local area network.

11. A method as claimed in claim 1, wherein said step of transmitting said first information from an external source is performed before said step of transmitting said first information from said computer terminal.

12. An electronic gaming system with a capability for peripheral device reprogramming comprising:

a central computer coupled by a local area network to a plurality of gaming terminals, each gaming terminal including a microprocessor, a memory and a communications module;

at least first and second peripheral devices coupled to at least first and second of said plurality of gaming terminals, respectively, each of said first and second peripheral devices including a processor, and a communications module, coupled to said communications module of a gaming terminal;

a flash memory for holding a program which determines the manner in which said processor of said peripheral device operates;

wherein said central computer and first and second gaming terminals are configured to transmit a first program from said central computer to said first and second gaming terminals for receipt by said communication modules of said first and second gaming terminals and storage in said memories of said first and second gaming terminals; and wherein said first and second gaming terminals and first and second peripheral devices are configured to transmit said program from said first and second gaming terminals to said first and second peripheral devices for storage in said flash memories of said first and second peripheral devices for use in controlling operation of said first and second peripheral devices.

13. An electronic gaming system as claimed in claim 12, wherein said peripheral devices comprise currency acceptors.

14. In an electronic gaming system, apparatus for providing first information for storage in a first memory of a peripheral device coupled to a computer gaming terminal, said computer gaming terminal having a second memory for storing programming for said computer gaming terminal, said first memory being a programmable memory coupled to said peripheral device, different from said second memory, the apparatus comprising:

means for transmitting said first information from an external source to said computer gaming terminal;

means for transmitting said first information from said computer gaming terminal for receipt by said peripheral device; and means for storing said first information in said first memory for use during operation of said peripheral device.

* * * * *